(12) United States Patent
Sasaki

(10) Patent No.: US 10,476,828 B2
(45) Date of Patent: Nov. 12, 2019

(54) INFORMATION PROCESSING DEVICE, INFORMATION PROCESSING METHOD, PROGRAM, AND STORAGE MEDIUM

(71) Applicant: Rakuten, Inc., Tokyo (JP)

(72) Inventor: Tomohiko Sasaki, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 194 days.

(21) Appl. No.: 15/028,484

(22) PCT Filed: Jan. 29, 2014

(86) PCT No.: PCT/JP2014/051973
§ 371 (c)(1),
(2) Date: Apr. 11, 2016

(87) PCT Pub. No.: WO2015/114757
PCT Pub. Date: Aug. 6, 2015

(65) Prior Publication Data
US 2016/0255031 A1 Sep. 1, 2016

(51) Int. Cl.
*G06F 15/16* (2006.01)
*H04L 12/58* (2006.01)
*G06Q 10/10* (2012.01)

(52) U.S. Cl.
CPC ........... *H04L 51/22* (2013.01); *G06Q 10/107* (2013.01); *H04L 51/16* (2013.01)

(58) Field of Classification Search
CPC ...... H04L 51/16; H04L 51/622; G06Q 10/107
USPC ........................................................ 709/206
See application file for complete search history.

(56) References Cited

U.S. PATENT DOCUMENTS

| | | | | |
|---|---|---|---|---|
| 9,336,674 | B1 * | 5/2016 | Thirumalaisamy | .... G08B 25/10 |
| 2006/0235933 | A1 * | 10/2006 | Baluja | ........... G06Q 10/107 |
| | | | | 709/207 |
| 2007/0088832 | A1 * | 4/2007 | Tsang | ............... G06Q 10/00 |
| | | | | 709/227 |
| 2010/0205259 | A1 * | 8/2010 | Vitaldevara | ...... G06Q 10/107 |
| | | | | 709/206 |
| 2012/0198017 | A1 * | 8/2012 | LeVasseur | ............ H04L 51/24 |
| | | | | 709/206 |
| 2013/0086181 | A1 * | 4/2013 | Vitaldevara | ...... G06Q 10/107 |
| | | | | 709/206 |

FOREIGN PATENT DOCUMENTS

JP 2003-087327 A 3/2003

OTHER PUBLICATIONS

International Search Report of PCT/JP2014/051973 dated Mar. 11, 2014.

* cited by examiner

*Primary Examiner* — Wing F Chan
*Assistant Examiner* — Joseph R Maniwang
(74) *Attorney, Agent, or Firm* — Sughrue Mion, PLLC

(57) ABSTRACT

To reduce an operational burden on a recipient to stop distribution. An information processing device provides an environment that stops distribution of an e-mail to this recipient based on report information transmitted according to move of a received e-mail to a specific folder by the recipient. That is, when the recipient of a distribution content, such as an e-mail newsletter, moves this e-mail to the specific folder, distribution stop is executed. This allows achieving a reduction in the operational burden on the recipient to stop the distribution.

18 Claims, 11 Drawing Sheets

Fig.7A

DESTINATION DESTINATION DB 9b

| USER ID | E-MAIL ADDRESS | DISTRIBUTION FLAG |
|---|---|---|
| USER A | aaa@xxx.com | OK |
| USER B | bbb@xxx.com | OK |
| USER C | ccc@yyy.net | OK |
| USER D | ddd@zzz.com | NG |
| USER E | eee@xyz.org | OK |
| ... | ... | ... |
| USER N | nnn@zyx.info | OK |

PERFORMANCE DB 9a

| USER ID | DISTRIBUTION COUNT | COUNT OF TRANSPORT |
|---|---|---|
| USER A | 202 | 15 |
| USER B | 202 | 31 |
| USER C | 41 | 35 |
| USER D | 138 | 35 |
| USER E | 77 | 2 |
| ... | ... | ... |
| USER N | 15 | 4 |

ISSUE ID=1

| RECEIVED DATE AND TIME | OPENING DATE AND TIME | TRANSPORT OPERATION DATE AND TIME |
|---|---|---|
| 2010/11/01 14:20 | 2010/11/01 14:28 | No Data |
| 2010/11/02 08:09 | 2010/11/02 15:30 | 2010/11/02 15:35 |
| No Data | No Data | No Data |
| No Data | No Data | No Data |
| No Data | No Data | No Data |
| ... | ... | ... |

11d 11e 11f

ISSUE ID=202

| RECEIVED DATE AND TIME | OPENING DATE | TRANSPORT OPERATION DATE AND TIME |
|---|---|---|
| 2013/12/14 15:11 | No Data | No Data |
| 2013/12/15 10:29 | 2013/12/15 11:01 | No Data |
| 2013/12/14 12:47 | No Data | 2013/12/14 12:49 |
| No Data | 2013/12/14 09:45 | No Data |
| 2013/12/14 09:42 | 2013/12/14 20:51 | 2013/12/14 20:52 |
| 2013/12/14 20:21 | | |

11c

INFORMATION PROCESSING DEVICE, INFORMATION PROCESSING METHOD, PROGRAM, AND STORAGE MEDIUM

CROSS REFERENCE TO RELATED APPLICATIONS

This is a National Stage of International Application No. PCT/JP2014/051973 filed Jan. 29, 2014, the contents of which are incorporated herein by reference in its entirety.

TECHNICAL FIELD

The present invention relates to a technical field of an information processing device, an information processing method, a program, and a storage medium that perform a distribution control and a distribution stop control of a distribution of e-mail distribution content for a plurality of e-mail recipients.

CITATION LIST

Patent Literature

Patent Literature 1: Japanese Unexamined Patent Application Publication No. 2003-087327

BACKGROUND ART

In association with a spread of e-mails, the e-mails have been used for various applications. Not only used as means for office liaisons, the e-mails are used as means for advertising and publicity. The e-mails used as means for advertising and publicity include e-mail newsletters, spam mails, or similar mails. These mails are regularly or irregularly distributed to introduce articles, goods, or similar items specialized in a certain specific field.

Some users may think that the e-mail newsletters are unnecessary from this time on or browsing the e-mail newsletters is troublesome. Additionally, the spam mails are originally not preferable. Accordingly, means for stopping distributing the e-mail newsletters and the spam mails have been proposed.

For example, the invention disclosed in Patent Literature 1 proposes the method that receives the e-mail informing the junk mail from the recipient to stop distribution to this recipient.

SUMMARY OF INVENTION

Technical Problem

However, the above-described method for distribution stop is a troublesome procedure for the recipients. The recipient often does not perform the procedure for stopping the distribution but just moves a received, unread e-mail to a recycle bin and a junk mail folder.

Therefore, the object of the present invention is to ensure reduction in a burden of the recipient when stopping the distribution of the e-mail.

Solution to Problem

First, an information processing device according to the present invention is configured as follows. The information processing device includes a report information acquiring unit, a move history managing unit, and a distribution stopping unit. The report information acquiring unit is configured to acquire report information. The report information is transmitted according to a move operation. The move operation is configured to move e-mail distribution content in series whose plurality of issues are distributed or are expected to be distributed to a specific folder by a user who has browsed the e-mail distribution content. The move history managing unit is configured to acquire user identification information of the user who has performed the move operation and series identification information of the e-mail distribution content, and both information are at least included in the report information. The move history managing unit is configured to manage the user identification information and the series identification information as move history information of the user for the series of the e-mail distribution content. The distribution stopping unit is configured to determine whether to stop distributing the e-mail distribution content to the user or not based on the move history information and a predetermined distribution stop condition. The distribution stopping unit is configured to execute distribution stop processing of the e-mail distribution content to the user based on the determination result.

This allows providing an environment that stops distributing the e-mail distribution content in series whose plurality of issues are distributed, for example, the e-mail newsletters, based on the report information. The report information is transmitted according to the move of the received e-mail to the specific folder by the recipient.

Here, in series means that e-mails, for example, e-mail newsletters, with the identical title are distributed over a plurality of times (plurality of issues).

The series identification information is common identification information assigned to each distribution content of the e-mails in series. For example, the identical series identification information is assigned to each distribution content of the e-mail newsletters distributed with the identical title.

Further, the move operation to the specific folder is not an operation indicative of clear intention of denial of reception by the user but is an operation likely to be performed when the user does not want to receive the e-mail or browse the content. That is, the move operation is just an operation where the intention of the denial of reception is inferred. The following various processing is effective to increase a likelihood of an inference for express one's will of denial of reception.

Secondly, with the information processing device according to the above-described present invention, the following is preferable. Regarding an e-mail distribution content group having the identical series identification information, the distribution stop condition is a condition based on a count of the e-mail distribution content on which the move operation has been performed by the user.

This executes the distribution stop based on the count of e-mail distribution content on which the move operation has been performed.

For example, assume the case where the count of move operation executions being a predetermined value of two or more is set as a condition. Regarding the e-mail distribution content as the e-mail newsletters with the identical title (e-mail distribution content in series), one-time move operation does not stop the distribution. Performing the move operation by the predetermined counts of two or more executes the distribution stop processing.

Thirdly, with the information processing device according to the above-described present invention, the following is preferable. Regarding an e-mail distribution content group having the identical series identification information, the distribution stop condition is a condition based on a proportion of: a count of the e-mail distribution content on which the move operation has been performed by the user; to a count of the e-mail distribution content distributed to the user.

Therefore, in the e-mail distribution content having the identical series identification information, the distribution count distributed to a certain user is regarded as a total distribution count, and among the total distribution count, the count of e-mail distribution content on which the move operation has been performed by the user is regarded as the count of moves. The proportion of the count of moves to the total distribution count changes depending on each distribution. The distribution stop condition changes based on the change in this proportion and the distribution stop processing is executed. This executes the distribution stop processing that performs the distribution stop inferring the user's interest in the e-mail distribution content having the identical series identification information.

Fourth, with the information processing device according to the above-described present invention, the following is preferable. Regarding an e-mail distribution content group having the identical series identification information, the distribution stop condition is a condition based on a proportion of a count of the e-mail distribution content on which the move operation has been performed by the user among the predetermined count of the email distribution content group, to the predetermined number.

Therefore, for example, the distribution stop processing is executed based on the proportion of count of e-mail distribution content on which the move operation has been performed by the user to ten e-mail distribution content having the identical series identification information distributed most recently. This executes the distribution stop processing further reflecting the change in the user's interest in the e-mail distribution content having the identical series identification information.

Fifth, with the information processing device according to the above-described present invention, the following is preferable. Regarding an e-mail distribution content group having the identical series identification information, the distribution stop condition is a condition based on a proportion of a count of the e-mail distribution content on which the move operation has been performed by the user to a count of the e-mail distribution content distributed to the user within a predetermined period.

Therefore, for example, the distribution stop processing is executed based on the proportion of count of e-mail distribution content on which the move operation has been performed by the user to the e-mail distribution content having the identical series identification information distributed during most recent six months. This executes the distribution stop processing reflecting the latest user's interest timewise on the e-mail distribution content in the identical series distributed irregularly.

Sixth, with the information processing device according to the above-described present invention, the following is preferable. In the case where the user does not perform the move operation on all the e-mail distribution content distributed to the user during the predetermined most recent period, the move history managing unit executes move history information initialization processing. The move history information initialization processing is configured to initialize move history information.

Therefore, for example, when the move operation is not performed on all the e-mail distribution content having the identical series identification information distributed during most recent six months by the user, the information processing device infers that the user's interest has been changed and executes the move history information initialization processing to perform initialization of the move history information. This executes the distribution stop processing fitting in the change in the user's interest.

Seventh, with the information processing device according to the above-described present invention, the following is preferable. The report information includes an opening date and a move operation date. The opening date is as time information when the user opens the e-mail distribution content. The move operation date is as time information when the move operation has been performed.

The move history managing unit is configured to manage the move history information including the opening date and the move operation date.

The distribution stop condition is a condition based on information on differential time between the opening date and the move operation date.

The use of the differential time infers the time required to browse contents of the e-mail distribution content to infer the user's interest in this e-mail distribution content.

This executes the distribution stop processing based on the user's substantial interest.

Eighth, with the information processing device according to the above-described present invention, the following is preferable. Regarding an e-mail distribution content group having the identical series identification information, the distribution stop condition is a condition based on an average value calculated by averaging information of the respective differential times among the e-mail distribution content on which the move operation has been performed by the user.

Therefore, the average value of the differential time becomes a value averaging the inference time required to browse contents of the e-mail distribution content.

This executes the distribution stop processing based on the change in the user's substantial interest in this e-mail distribution content.

Ninth, with the information processing device according to the above-described present invention, the following is preferable. In the case where the distribution stopping unit determines distribution stop of the e-mail distribution content to the user, the distribution stopping unit executes the distribution stop processing and then execute notification processing to the user.

This prevents the state where the user does not recognize the distribution stop.

Tenth, with the information processing device according to the above-described present invention, the following is preferable. When the distribution stopping unit determines distribution stop of the e-mail distribution content to the user, the distribution stopping unit executes notification processing to the user and then execute the distribution stop processing based on a response to the notification processing from the user.

Based on the user's response, the distribution stop processing fitting in the user's inclination is executed.

Eleventh, with the information processing device according to the above-described present invention, the following is preferable. The distribution stopping unit is configured to execute the distribution stop processing under a condition that the user does not respond for a predetermined period.

Therefore, even if the user does not respond, the distribution of the e-mail newsletter is stopped.

Twelfth, with the information processing device according to the above-described present invention, the following is preferable. The distribution stopping unit is configured to execute the distribution stop processing under a condition that the user responds within a predetermined period expressing a desire of distribution stop.

This executes the distribution stop of the e-mail newsletter only when the user responds expressing the desire of the distribution stop.

Thirteenth, with the information processing device according to the above-described present invention, the following is preferable. The distribution stopping unit is configured not to execute the distribution stop processing under a condition that the user responds within a predetermined period expressing a desire of distribution continuation.

This does not increase the operational burden on the user to stop the distribution. This also allows preventing distribution stop by mistake.

Fourteenth, with the information processing device according to the above-described present invention, the following is preferable. The distribution stopping unit is configured to execute distribution continuation processing to continue distribution under a condition that the user responds within a predetermined period expressing the desire of the distribution continuation.

The distribution continuation processing is processing to continue the distribution executed in addition to the inexecution of the distribution stop processing. For example, the distribution continuation processing is processing such as initialization of each move history information used for the determination based on the distribution stop condition.

The execution of distribution continuation processing prevents the determination of meeting the distribution stop condition each time the distribution content of the e-mail is distributed.

The information processing method according to the present invention includes: acquiring report information transmitted according to a move operation, the move operation moving e-mail distribution content in series whose plurality of issues are distributed or are expected to be distributed to a specific folder by a user who has browsed the e-mail distribution content; acquiring user identification information of the user who has performed the move operation and series identification information of the e-mail distribution content, both information being at least included in the report information, managing the user identification information and the series identification information as move history information of the user for the series of the e-mail distribution content; and determining whether to stop distributing the e-mail distribution content to the user or not based on the move history information and a predetermined distribution stop condition, executing distribution stop processing of the e-mail distribution content to the user based on the determination result.

This information processing method establishes an environment that stops the distribution of e-mail based on the report information, which is transmitted according to the move of the received e-mail to the specific folder by the recipient.

A program according to the present invention is a program that causes an information processing device to execute the processing executed as the information processing method.

A storage medium according to the present invention is a storage medium storing the program. These program and storage medium achieve the above-described information processing device.

Advantageous Effects of Invention

According to the present invention, the environment that stops distribution of the e-mail based on the report information transmitted according to the move of the received e-mail to the specific folder by the recipient is provided. This allows reducing an operational burden on the recipient to stop the distribution.

BRIEF DESCRIPTION OF THE DRAWINGS

FIG. 7A and FIG. 7B are explanatory views illustrating exemplary information stored in an e-mail newsletter DB;

DESCRIPTION OF EMBODIMENTS

Figure 1:
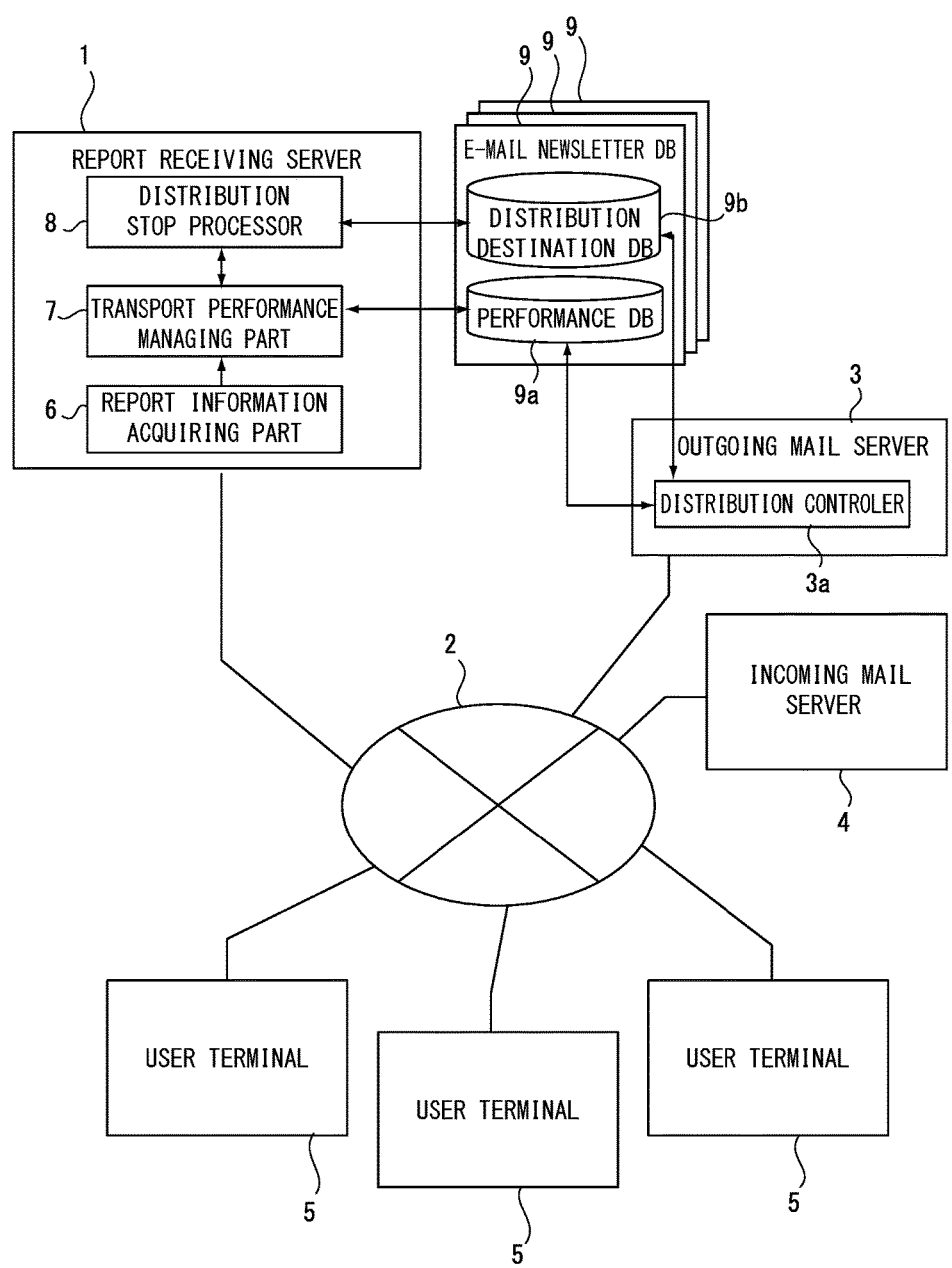
FIG. 1 is a block diagram illustrating an entirety including an information processing device of an embodiment of the present invention.

The following describes embodiments in the order listed below.
1. System Configuration
2. Flow of Processing
3. Processing of Incoming Mail Server
4. Respective Embodiments
4-1. First Embodiment
4-2. Second Embodiment
4-3. Third Embodiment
4-4. Fourth Embodiment
4-5. Fifth Embodiment
5. Modifications of User Notification
5-1. Modification 1
5-2. Modification 2
6. Other Modifications
7. Program and Storage Medium 1. System Configuration First, the following describes an overall configuration including an information processing device of the present invention with reference to FIG. 1. A report receiving server 1 in FIG. 1 corresponds to an information processing device of an embodiment of the present invention.

The report receiving server 1 is mutually communicatively coupled to an outgoing mail server 3, an incoming mail server 4, user terminals 5, 5, 5, . . . via a communications network 2.

The configuration of the communications network 2 is not especially limited, and various examples are assumed. For example, the Internet, an intranet, an extranet, Local Area Network (LAN), a Community Antenna Television (CATV) communications network, a Virtual Private Network, a telephone network, a mobile telecommunications network, a satellite communications network, or a similar network is assumed.

Various examples of a transmission medium constituting the all or a part of the communications network 2 are also assumed. For example, a wire system, such as the Institute of Electrical and Electronics Engineers (IEEE) 1394, a Universal Serial Bus (USB), a power-line carrier, and a telephone line, an infrared radiation, such as an Infrared Data Association (IrDA), and also a wireless system, such as the Bluetooth (registered trademark), the 802.11 wireless, a mobile phone network, a satellite channel, and a digital terrestrial network are applicable.

This embodiment describes the e-mail newsletter as an example of an e-mail distributed from the outgoing mail server 3. This, however, should not be construed in a limiting sense. This embodiment is applicable to, for example, an e-mail exchanged among friends using a mailing list. Here, the e-mail newsletter means a distribution content group formed of a series of e-mails of a plurality of issues distributed for a certain specific purpose. The distribution content each has series identification information as identification information unique to the series. Further, as information of the issue (for example, issue numbers assigned in the series in the order of issuance), the distribution content has issue information.

The report receiving server 1 is a server that receives report information on a move operation. The move operation is transmitted when a user who has received the e-mail as the e-mail newsletter performs a predetermined move operation on the e-mail newsletter. The report information is exchanged, for example, by receiving the e-mail. The following describes this e-mail as a report mail. The report receiving server 1 executes report analysis processing on the received report information, manages move history information on the move operation of each user based on a processing result, and executes distribution stop processing based on the move history information. The details of the report analysis processing and the distribution stop processing will be described later.

Therefore, the report receiving server 1 includes a report information acquiring unit 6, a move history managing unit 7, and a distribution stopping unit 8.

The report information acquiring unit 6 acquires the report information transmitted corresponding to the move operation. The user who has browsed the e-mail newsletter performs the move operation that moves the e-mail newsletter to a specific folder.

The move history managing unit 7 acquires user identification information of the user who has executed the move operation and the series identification information of the e-mail newsletter, which are at least included in the report information received from the report information acquiring unit 6. The move history managing unit 7 executes processing of managing the user identification information and the series identification information as the move history information for the user of the e-mail newsletter in the series.

The distribution stopping unit 8 determines whether to stop distributing the e-mail newsletter to the user or not based on the move history information, which is managed by the move history managing unit 7, and a predetermined distribution stop condition. Based on the result of this determination, the distribution stopping unit 8 executes the distribution stop processing of the e-mail newsletter to this user.

The distribution stop condition set to each e-mail newsletter may be stored in each database, which will be described later, or may be stored in different, independent databases.

An e-mail newsletter Database (DB) 9 is a database disposed for each e-mail newsletter having identical series identification information. The e-mail newsletter DB 9 includes a history DB 9a and a distribution destination DB 9b. The history DB 9a stores the move history information of the user. The distribution destination DB 9b stores the user identification information, the e-mail address, or similar information as the distribution destination information of the e-mail newsletter.

The report receiving server 1 exchanges information with the e-mail newsletter DB 9, which is disposed corresponding to each e-mail newsletter. Specifically, the move history managing unit 7 of the report receiving server 1 executes history DB update processing on the history DB 9a according to the report analysis processing. The distribution stopping unit 8 executes distribution destination DB update processing on the distribution destination DB 9b according to the distribution stop processing.

The outgoing mail server 3 includes a distribution controller 3a. The distribution controller 3a performs the distribution control of the e-mail newsletter based on the distribution destination information in the distribution destination DB 9b. First, the distribution controller 3a refers to the e-mail addresses of the distribution destinations listed in the distribution destination DB 9b to execute the distribution control for each user. Thus, the e-mail newsletter is distributed to the incoming mail server 4 via the communications network 2. When the e-mail newsletter is distributed to the incoming mail server 4, each user browses the distributed e-mail newsletter using the user terminal 5. The e-mail as the e-mail newsletter may be browsed by browsing the e-mail stored on the incoming mail server 4 via a web browser installed on the user terminal 5 or a similar medium like webmail service. Alternatively, this e-mail data may be downloaded from the incoming mail server 4 to the user terminal 5 to browse this e-mail on the user terminal 5. Without distinction of both cases, the following represents the browsing of the e-mail as the e-mail newsletter by the user as the reception or browsing of the e-mail newsletter.

The outgoing mail server 3 executes processing of updating information, such as the circulation of e-mail newsletter, on the history DB 9a corresponding to the distributed e-mail newsletter.

Figure 2:
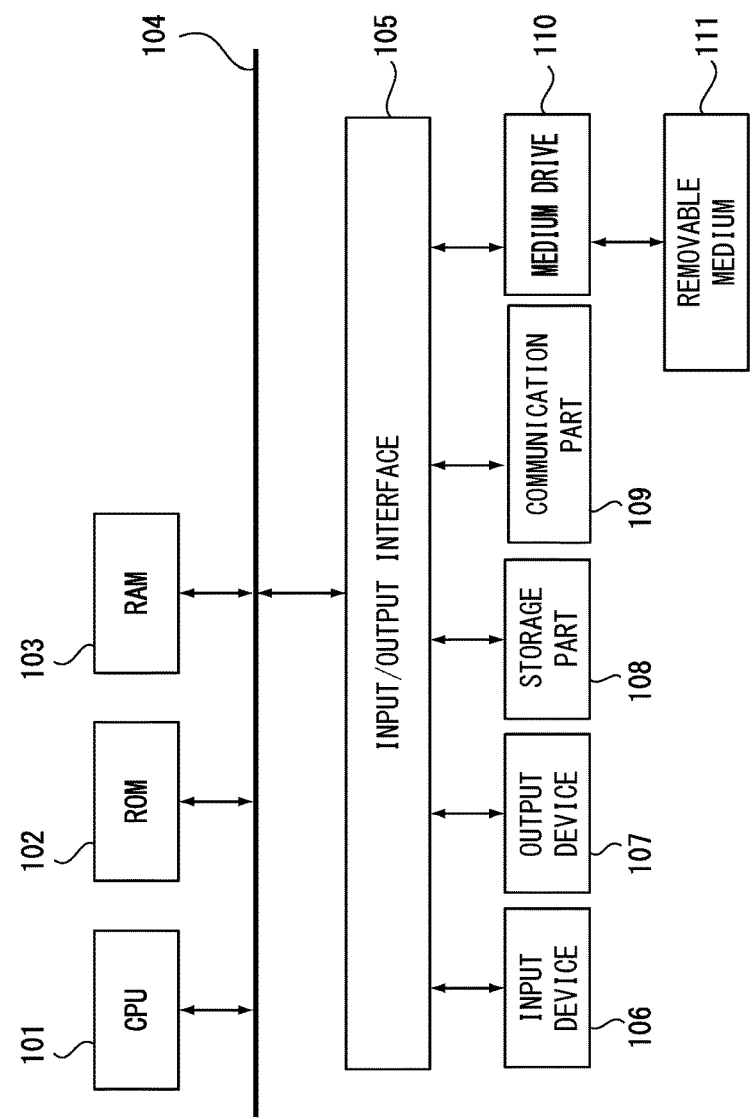
FIG. 2 is a block diagram of a computer device of the embodiment.

FIG. 2 is an exemplary diagram illustrating the hardware configuration of each report receiving server 1, outgoing mail server 3, incoming mail server 4, and user terminal 5 illustrated in FIG. 1. A Central Processing Unit (CPU) 101 of a computer device in each server and terminal executes various processing in accordance with a program stored in a Read Only Memory (ROM) 102 and a program loaded from a storage unit 108 to a Random Access Memory (RAM) 103. The RAM 103 also appropriately stores data required for the CPU 101 to execute various processing or similar data.

The CPU 101, the ROM 102, and the RAM 103 are mutually coupled via a bus 104. To this bus 104, an input/output interface 105 is also coupled.

To the input/output interface 105, an input unit 106 formed of a keyboard, a computer mouse, a touchscreen, and a similar component, a display formed of a Liquid Crystal Display (LCD), a Cathode Ray Tube (CRT), an organic Electroluminescence (OEL) panel, and a similar component, an output unit 107 formed of a speaker and a similar component, the storage unit 108 formed of a Hard Disk Drive (HDD), a flash memory device, and a similar component, and a communication unit 109 that performs communication processing via a communications network 2 or a device-to-device communications are coupled.

Additionally, to the input/output interface 105, a medium drive 110 is coupled as necessary and a magnetic disk, an optical disk, a magneto-optical disk, or a removable medium 111, such as a semiconductor memory, are appropriately mounted to write and read information to/from the removable medium 111.

Such computer device can upload and download data and a program through communications by the communication unit 109 and exchange the data and the program via the removable medium 111.

When the CPU 101 executes processing operations based on various programs, the report receiving server 1, the outgoing mail server 3, the incoming mail server 4, and the user terminal 5 each executes information processing and communications described later.

Each information processing device constituting the report receiving server 1, the outgoing mail server 3, the incoming mail server 4, and the user terminal 5 is not limited to the configuration with a single computer device as illustrated in FIG. 2. The plurality of computer devices may be systematized and be configured. The plurality of computer devices may be systematized with, the LAN or a similar medium. Alternatively, the plurality of computer devices may be remotely disposed with, for example, the Virtual Private Network (VPN) using the Internet or a similar medium.

2. Flow of Processing

Figure 3:
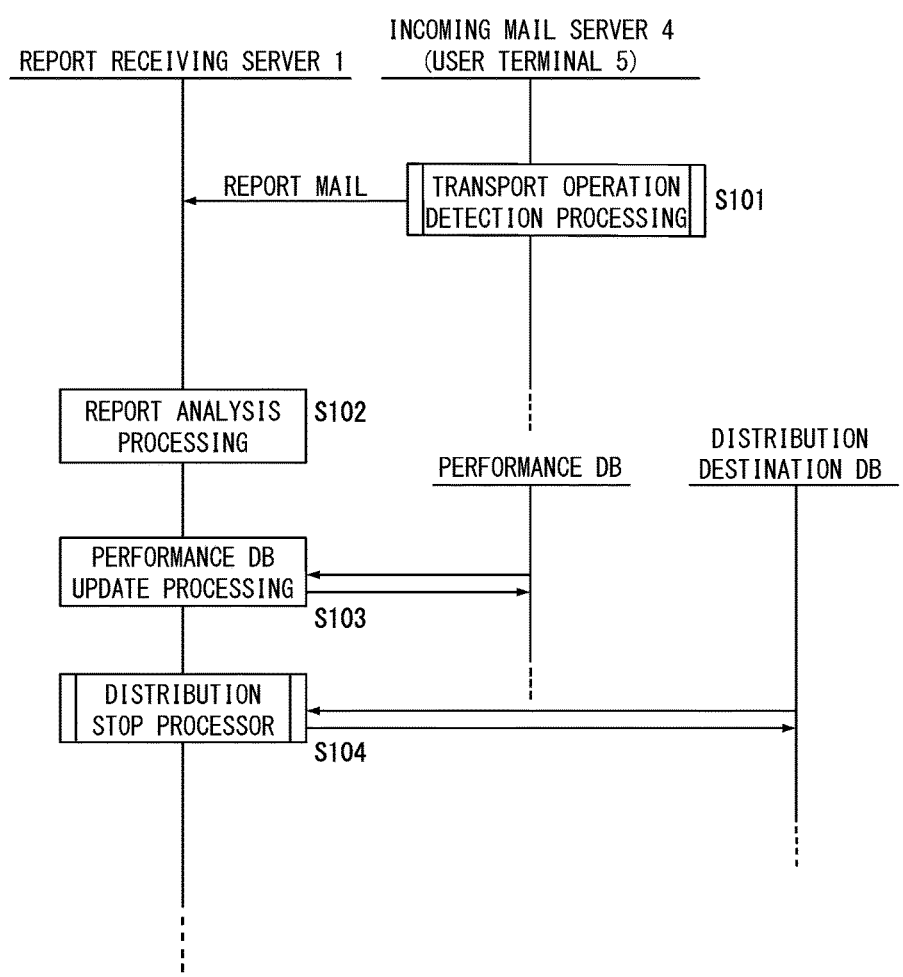
FIG. 3 is an explanatory view illustrating an outline of an entire flow.

Next, the following describes an outline of a flow of processing in the embodiment of the present invention with reference to FIG. 3.

When the user who receives the e-mail newsletter performs the predetermined move operation, first, the incoming mail server 4 executes move operation detection processing at Step S101. This transmits the report mail including the move history information to the report receiving server 1.

Figure 4:
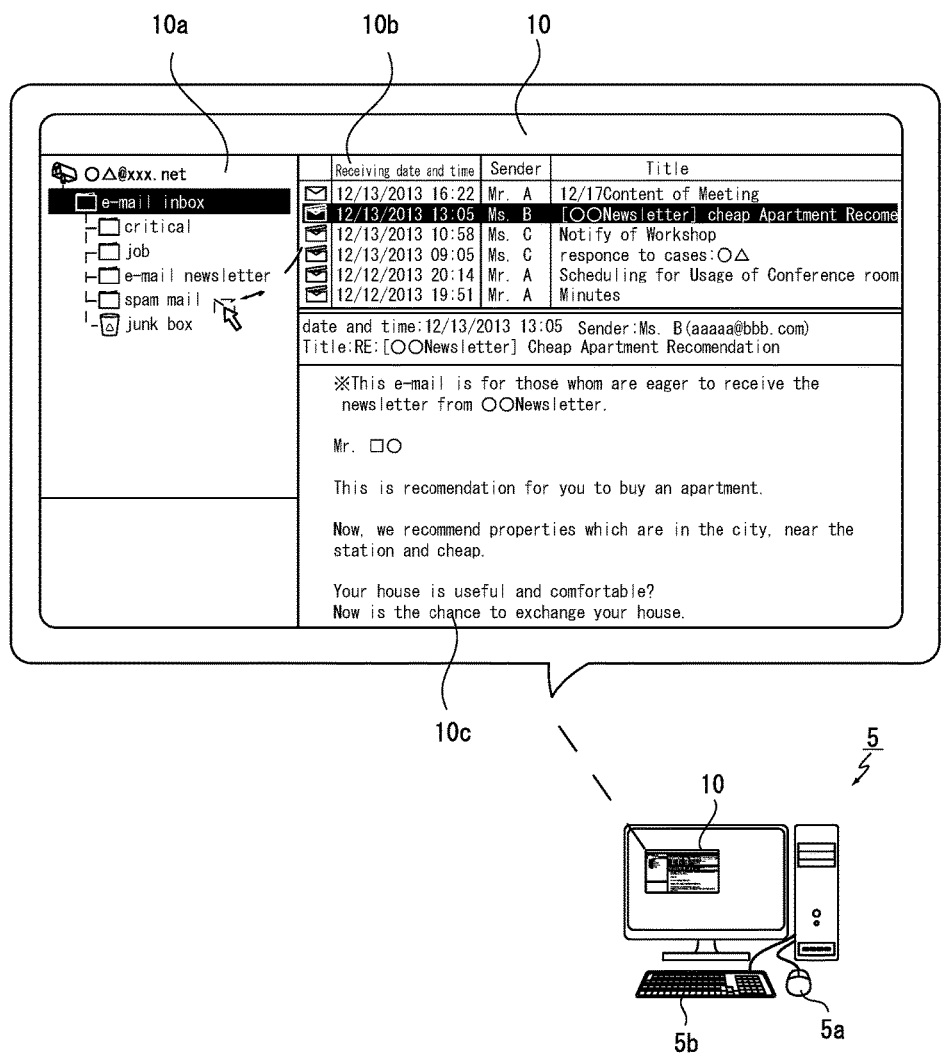
FIG. 4 is an explanatory view illustrating an exemplary move operation executed on a user terminal.

Here, the predetermined moving operation is an operation that moves the e-mail newsletter to a specific folder. For example, the predetermined moving operation means an operation to move the e-mail as the e-mail newsletter to a junk mail folder (or a junk mail box). FIG. 4 illustrates an exemplary method for moving the corresponding e-mail to the junk folder.

FIG. 4 illustrates a display screen of mail browsing software 10 started on the user terminal 5. The display screen of the mail browsing software 10 includes a folder structure display unit 10a, a list display unit 10b, and a body text display unit 10c. The folder structure display unit 10a hierarchically displays various folders. The list display unit 10b displays the list of received e-mails. The body text display unit 10c displays the body text of the e-mail selected in the list display unit 10b. The user operates a computer mouse 5a or a keyboard 5b to select the corresponding e-mail displayed in the list display unit 10b. Then, the user drags and drops the e-mail to the junk mail folder in the folder structure display unit 10a, thus allowing moving the e-mail as the move operation.

Besides, a method where the user right-clicks the computer mouse 5a on the corresponding e-mail displayed in the list display unit 10b to display and select the menu "Move this mail to the junk mail folder" and move the e-mail, and a similar method are listed. In the case where the user terminal 5 is a terminal operable via a touch operation on a smart phone or a similar display, a method where the screen is operated with a fingertip to perform an operation equivalent to the above-described move operation is also available.

Figure 5:
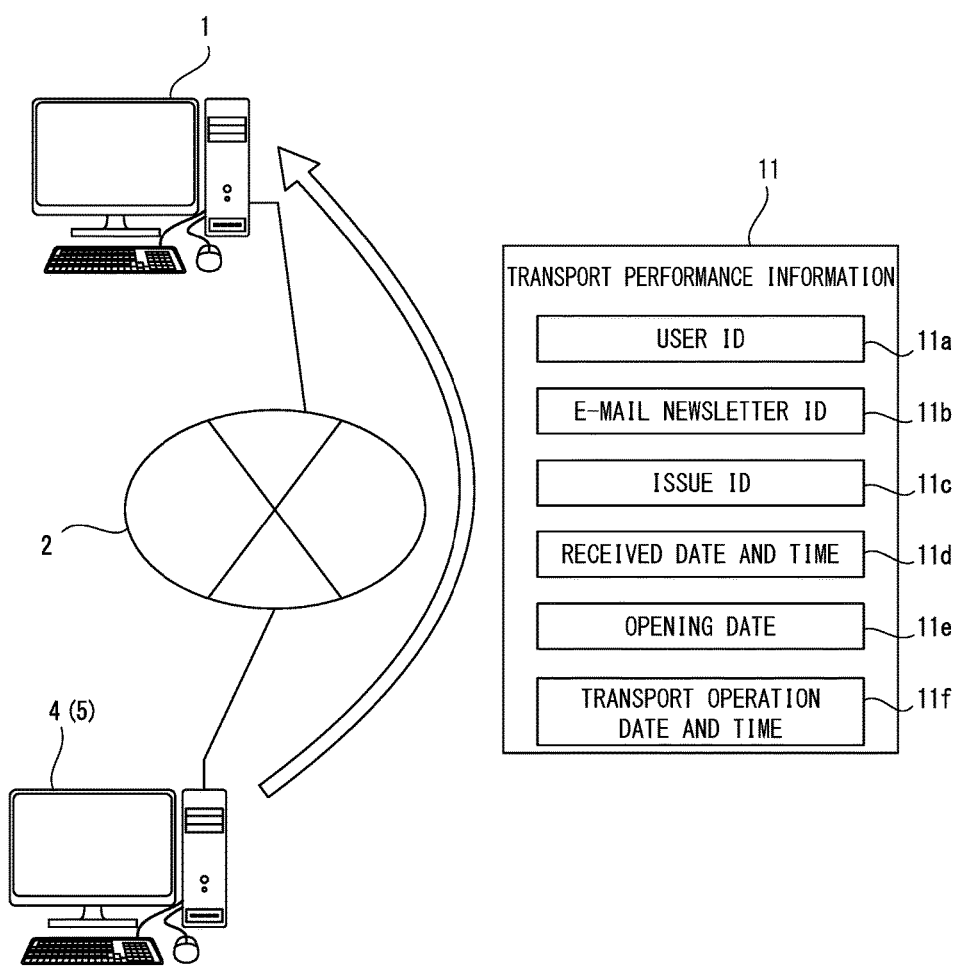
FIG. 5 is an explanatory view of move history information by a user transmitted to a report receiving server.

Next, the report receiving server 1 executes the report analysis processing at Step S102 in FIG. 3. The report analysis processing analyzes the content of the received report mail and extracts the move history information. Here, exemplary information included in the report information received by the report information acquiring unit 6 of the report receiving server 1 is illustrated in FIG. 5. The report mail transmitted from the incoming mail server 4 includes information as move history information 11 of the user, such as a user identification (ID) 11a as the user identification information, an e-mail newsletter ID 11b as the series identification information of the e-mail newsletter, an issue ID 11c as issue information, a received time 11d, an opening date 11e, a move operation date 11f, and similar information.

Some embodiments, which will be described later, do not need to include these all information, and use the report mail including necessary information appropriately. The user ID 11a is exemplary user identification information. As long as information by which each user can be individually identified, the user identification information is not limited to the user ID.

Next, Step S103 in FIG. 3 performs history DB update processing that executes information update on the history DB 9a. The move history managing unit 7 of the report receiving server 1 executes these processing.

Next, the report receiving server 1 executes the distribution stop processing based on the information in the history DB 9a and the distribution stop condition of this e-mail newsletter at Step S104. The distribution stop processing executes the distribution destination DB update processing that executes the information update on the distribution destination DB. The distribution stopping unit 8 of the report receiving server 1 executes this processing.

The details of the distribution stop processing will be described later based on some embodiments. Then, the distribution stop processing at Step S104 will be described as Step S104A, Step S104B, Step S104C, Step S104D, and Step S104E according to each embodiment. The distribution stop processing will be described as Step S104X and Step S104Y according to each modification described later.

Here, to receive the e-mail newsletter by the webmail service or a similar case, as described above, the incoming mail server 4 performs move operation detection and report mail creation. However, in the case where the e-mail is downloaded to the user terminal 5 for browsing, the user terminal 5 may execute each processing of Step S101, Step S102, and Step S103, which are performed on the above-described incoming mail server 4. In this case, the e-mail browsing software or similar software operated on the user terminal 5 has functions to execute the move operation detection and the report mail creation.

3. Processing of Incoming Mail Server

Figure 6A:
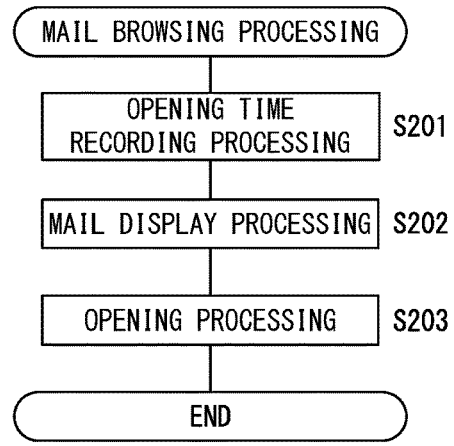
FIG. 6A and FIG. 6B are flowcharts describing processing when executing a move operation on a browsed mail.
Figure 6B:
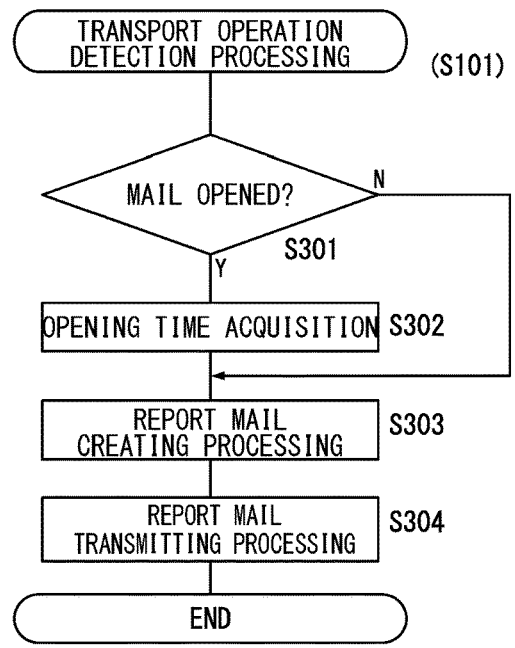

Next, the following describes processing on the user side with reference to FIG. 6A and FIG. 6B.

Here, the user side processing is processing executed on the incoming mail server 4 or the user terminal 5. The following describes the user side processing as processing on the incoming mail server 4.

The user browses the distribution content in the e-mail as the e-mail newsletter using the user terminal 5 as described above. Corresponding to the browsing of the e-mail on the user terminal 5, the incoming mail server 4, for example, executes mail browsing processing as illustrated in FIG. 6A. In the mail browsing processing, first, the incoming mail server 4 executes opening time recording processing at Step S201. The opening time recording processing acquires time of browsing the corresponding e-mail.

Next, the incoming mail server 4 executes mail display processing at Step S202. The mail display processing transmits data required to display the e-mail on the user terminal 5 to the user terminal 5. Then, the incoming mail server 4 executes opening processing corresponding to the opening of the corresponding e-mail at Step S203. The opening processing, for example, changes an opening flag (0: unopened, 1: opened) of the corresponding e-mail from 0 to 1.

When the user performs the predetermined move operation, the incoming mail server 4 executes the move operation detection processing at Step S101 illustrated in FIG. 3. The move operation detection processing specifically executes, for example, processing illustrated in FIG. 6B.

In the move operation detection processing at Step S101, first, the incoming mail server 4 confirms whether the mail has been opened or not at Step S301. When the mail is open, the incoming mail server 4 acquires the opening time at Step S302 and executes report mail creating processing at Step S303. If the mail is not open at Step S301, the incoming mail server 4 does not execute the processing at Step S302 but executes report mail creating processing at Step S303. The report mail creating processing creates the report mail appropriately including the information, such as the user ID 11a, the e-mail newsletter ID 11b, the issue ID 11c, the received time 11d, the opening date 11e, and the move operation date 11f as the move history information 11 of the user as necessary.

Next, the incoming mail server 4 executes report mail transmitting processing to transmit the report mail to the report receiving server at Step S304.

Here, the transmission destination of the report mail will be described.

Generally, a unit before the "at mark of an e-mail address" is regarded as a local unit and a unit after the "at mark" is regarded as a domain unit. Request For Comments (RFC) 2821 specifies the local unit as 64 bytes at maximum.

The RFC5965 proposes the Abuse Reporting Format (ARF). The Abuse Reporting Format is a mechanism that feeds back behaviors of the user who has received the e-mail to the transmission source of the e-mail. This allows setting the e-mail address of the transmission destination of the report information for feedback. The incoming mail server 4 creates a character string within 64 bytes formed by coding information including the user ID 11a, the e-mail newsletter ID 11b, and the issue ID 11c. The incoming mail server 4 creates the e-mail as e-mail newsletter where the e-mail address to which the character string is set to the local unit is set as the transmission destination of the report information for feedback, and transmits the e-mail newsletter to each user. In this case, the e-mail address set as the transmission destination of the report information differs depending on each user and each e-mail newsletter.

In the case where the reporter receiving server 1 receives the report mail on the e-mail newsletter transmitted by the above-described method, the report receiving server 1 decodes the local unit of the received e-mail address in the report analysis processing, which will be described later. This allows acquiring the user ID 11a, the e-mail newsletter ID 11b, and the issue ID 11c.

The coded character string within 64 bytes is preferable to be a character string including check sum information.

In addition to the above-described method, each report information may be described at the body text of the mail. In this case, the report information can include information such as the received time 11d, the opening date 11e, and the move operation date 11f.

4. Respective Embodiments

Here, the processing by the report receiving server 1 in the respective embodiments will be described.

In each embodiment described below, unless otherwise described, the report receiving server 1 having respective functions as the report information acquiring unit 6, the move history managing unit 7, and the distribution stopping unit 8 executes each processing in the flows illustrated in respective drawings of FIG. 6A and FIG. 6B and FIG. 8A to FIG. 11B.

First, the following describes explanations on each database treated by the report receiving server 1 with reference to FIG. 7A and FIG. 7B.

The distribution destination DB 9b is disposed for each e-mail newsletter having identical e-mail newsletter ID. As illustrated in FIG. 7A, the distribution destination DB 9b stores the user ID, the e-mail address for each user, and a distribution flag. The distribution flag indicates whether distribution of the e-mail newsletter to each user is permitted or not.

Here, the e-mail newsletter with the identical e-mail newsletter ID is, for example, a sequence of distribution content group in series to which the identical title is assigned. As one example, an e-mail newsletter to which a title such as an "ABC magazine" or "DEF communications" is given can be listed.

The outgoing mail server 3 refers to the e-mail address for each user stored in the distribution destination DB 9b, which is disposed for each e-mail newsletter, to distribute this e-mail newsletter. In this respect, the outgoing mail server 3 refers to the distribution flag set to each user ID to determine whether to distribute the e-mail newsletter or not.

When the distribution stopping unit 8 of the report receiving server 1 executes the distribution stop of the e-mail newsletter in the distribution stop processing, which will be described later, the distribution stopping unit 8 updates the distribution flag of each user in the distribution destination DB 9b corresponding to the corresponding e-mail newsletter.

In the distribution destination DB 9b, it is not necessary that one e-mail address is made correspond to each user ID. The plurality of e-mail addresses may be set to one user ID. In this case, the distribution flag may be set to each e-mail address.

The history DB 9a is also disposed for each e-mail newsletter having the identical e-mail newsletter ID. As illustrated in FIG. 7B, the history DB 9a stores the user ID, a distribution count indicative of a count of content of the e-mail newsletters distributed to each user, a count of moves indicative of a count of content of the e-mail newsletter on which the move operation has been performed by each user, and time information for each issue ID. The time information for each issue ID includes the received time, the opening date, and the move operation date.

The received time means time that the incoming mail server 4 receives the e-mail newsletter with the corresponding issue ID.

The opening date means time when the user opens the e-mail as each distribution content of the e-mail newsletter. The opening date, for example, is a time when changing the opening flag for the corresponding e-mail to opened. The opening flag for the e-mail may be changed by browsing the corresponding e-mail or manual operation by the user. Therefore, browsing the content of the e-mail newsletter without opening the e-mail newsletter is also possible. In this case, the opening date is not recorded.

The move operation date is time when the user performs the move operation on each distribution content in the e-mail newsletter.

When distributing the e-mail newsletter, the outgoing mail server 3 updates the distribution count of the user ID for which the e-mail newsletter has been distributed to the history DB 9a corresponding to the corresponding e-mail newsletter.

The move history managing unit 7 of the report receiving server 1 updates the count of moves of the corresponding user ID and the time information for each issue ID to the history DB 9a corresponding to the e-mail newsletter according to the report information based on the report information.

The information stored in the distribution destination DB 9b and the history DB 9a is not limited to the ones shown above. It is unnecessary to include all the information.

4-1. First Embodiment

The first embodiment describes an example where the distribution of the corresponding e-mail newsletter to the user is stopped when the report receiving server 1 receives the report mail corresponding to the move operation performed by the user.

In the first embodiment, the report receiving server 1 executes each processing shown from Step S102 to Step S104 in FIG. 3. The same applies to the following respective embodiments.

When the report receiving server 1 receives the report mail from the incoming mail server 4, the report receiving server 1 executes the report analysis processing at Step S102 as shown in FIG. 3 to acquire the user ID 11a and the e-mail newsletter ID 11b. Subsequently, the report receiving server 1 executes the history DB update processing at Step S103. Specifically, for example, the report receiving server 1 updates a moving flag (0: OFF, 1: ON) for the information on the e-mail newsletter ID 11b stored in the history DB 9a. In this case, the history DB 9a stores the moving flag as well as each information illustrated in FIG. 7B. The moving flag may be disposed for each issue ID of the e-mail newsletter or may be disposed by one for each user ID.

Next, the report receiving server 1 executes the distribution stop processing at Step S104.

Figure 8A:
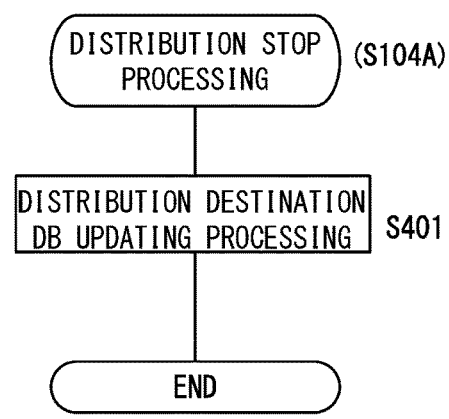
FIG. 8A and FIG. 8B are flowcharts describing processing executed by the report receiving server in a first embodiment.

This first embodiment executes the distribution stop processing S104A as the distribution stop processing S104. In the distribution stop processing S104A, as illustrated in FIG. 8A, the report receiving server 1 executes the distribution destination DB update processing at Step S401. The distribution destination DB update processing executes update processing. The update processing changes the distribution flag (see FIG. 7A) of the user ID 11a acquired in the report analysis processing from OK to NG to the information stored in the distribution destination DB 9b regarding the e-mail newsletter ID 11b acquired from the result of the report analysis processing.

The above-described first embodiment includes the report information acquiring unit 6, the move history managing unit 7, and the distribution stopping unit 8. The report information acquiring unit 6 is configured to acquire report information. The report information is transmitted according to a move operation. The move operation is configured to move e-mail distribution content in series whose plurality of issues are distributed or are expected to be distributed to a specific folder by a user who has browsed the e-mail distribution content. The move history managing unit 7 is configured to acquire user identification information of the user who has performed the move operation and series identification information of the e-mail distribution content, and both information are at least included in the report information. The move history managing unit 7 is configured to manage the user identification information and the series identification information as move history information of the user for the series of the e-mail distribution content. The distribution stopping unit 8 is configured to determine whether to stop distributing the e-mail distribution content to the user or not based on the move history information and a predetermined distribution stop condition. The distribution stopping unit 8 is configured to execute distribution stop processing of the e-mail distribution content to the user based on this determination result.

Therefore, the information processing device and the information processing method according to the first embodiment provides an environment where the distribution of the e-mail is stopped based on the report information. The report information is transmitted corresponding to the move of the received e-mail to the specific folder by the recipient. This ensures reducing the burden on the recipient when stopping the distribution of the e-mail.

Figure 8B:
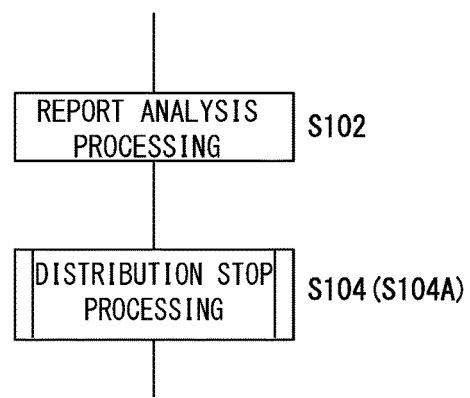

In the first embodiment, even if the report receiving server 1 does not execute substantial processing in the history DB update processing at Step S103, the equivalent distribution stop processing can be executed (see FIG. 8B). In this case, as the move history information 11 described in the report mail, it is only necessary that the move history information 11 includes the user ID 11a and the e-mail newsletter ID 11b, and it is only necessary that the e-mail newsletter DB 9 includes the distribution destination DB 9b.

4-2. Second Embodiment

The second embodiment describes an example where the distribution of the corresponding e-mail newsletter to the user is stopped according to a count of move operations performed by the user.

After receiving the report mail, the report receiving server 1 executes the report analysis processing at Step S102 in FIG. 3 to acquire the user ID 11a, the e-mail newsletter ID 11b, and the issue ID 11c.

Next, the report receiving server 1 executes the history DB update processing at Step S103. Specifically, the report receiving server 1 adds 1 to the count of moves of the user ID 11a for the information on the e-mail newsletter ID 11b stored in the history DB 9a.

Figure 9A:
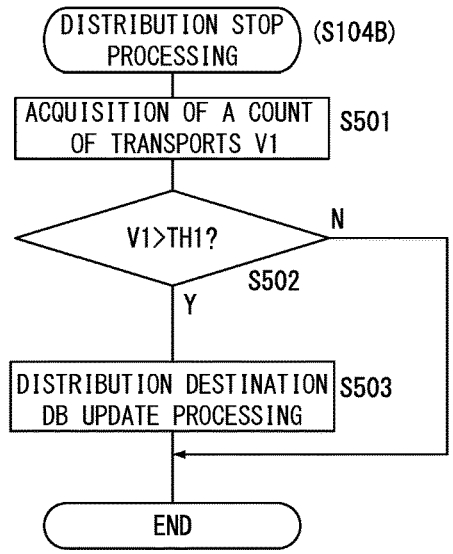
FIG. 9A and FIG. 9B are flowcharts illustrating distribution stop processing in a second embodiment and a third embodiment.

Subsequently, the report receiving server 1 executes the distribution stop processing Step S104B as the distribution stop processing Step S104 illustrated in FIG. 3. In the distribution stop processing S104B, specifically as illustrated in FIG. 9A, the report receiving server 1 first acquires a count of moves V1 of the corresponding user ID from the information corresponding to the e-mail newsletter ID 11b stored in the history DB 9a at Step S501. At this time, the report receiving server 1 acquires only the count of moves V1 of the user ID in the updated DB. However, the report receiving server 1 may acquire the count of moves of each user stored in the history DB 9a and execute the following processing on each user.

Next, the report receiving server 1 compares the count of moves V1 corresponding to the acquired user ID and a move count threshold TH1 at Step S502. To execute processing for distribution stop on the user ID whose count of moves V1 is larger than the move count threshold TH1 at Step S502, the report receiving server 1 executes the distribution destination DB update processing at Step S503. In the case where the count of moves V1 is equal to or less than the move count threshold TH1, the report receiving server 1 terminates the distribution stop processing S104B.

The distribution destination DB update processing at Step S503 changes the distribution flag (see FIG. 7A) corresponding to the user ID where the distribution stop needs to be performed from OK to NG. The distribution destination DB update processing as processing for the distribution stop in the following embodiments performs the similar processing.

To execute the processing from the above-described Step S501 to Step S503 on the plurality of user IDs, the sequence of processing from Step S501 to Step S503 may be executed on one user ID and the sequence of processing may be processed in a loop by the count of corresponding user IDs. Alternatively, the processing on each user ID may be processed in the loop in the processing at each Step. The similar modification is also possible in the respective embodiments described later.

In the above-described second embodiment, the distribution stop condition is a condition based on the count of e-mail distribution content on which the move operation has been performed by the user in the e-mail distribution content group having the identical series identification information. That is, if the count of e-mail distribution content on which the move operation has been performed by the user is equal to or more than the threshold in the e-mail distribution content group having the identical e-mail newsletter ID, the distribution stop is executed.

An action of moving the e-mail to the specific folder (for example, the junk mail folder) is not an action of expressing user's intention of desiring the distribution stop to the report receiving server 1. However, from the action, it can be inferred that the user wants to stop the distribution. Therefore, in the case where the count of move operations becomes equal to or more than the threshold, the report receiving server 1 determines that the intention of stopping the distribution seems to be definite and executes the distribution stop. This allows providing an e-mail newsletter distribution system inferring the user's intention. Especially, when setting the move count threshold TH1 to 2 or more, the one-time move operation does not stop the distribution, but performing the move operation by several times executes the processing of distribution stop. This allows providing the distribution system to which an interest of each user to the corresponding e-mail newsletter is reflected while reducing the distribution stop caused by incorrect move operation to some extent, in addition to the effects described in the first embodiment.

4-3. Third Embodiment

The third embodiment describes an example where the distribution of the corresponding e-mail newsletter to the user is stopped according to the proportion of count of distribution content on which the move operation has been performed to the count of distribution content of the e-mail newsletter distributed to the user.

The processing by the report receiving server 1 in the third embodiment is as follows. After receiving the report mail, the report receiving server 1 executes the report analysis processing at Step S102 to acquire the user ID 11a, the e-mail newsletter ID 11b, and the issue ID 11c.

Next, the report receiving server 1 executes the history DB update processing at Step S103. Specifically, the report receiving server 1 adds 1 to the count of moves of the user ID 11a for the information on the e-mail newsletter ID 11b stored in the history DB 9a.

Figure 9B:
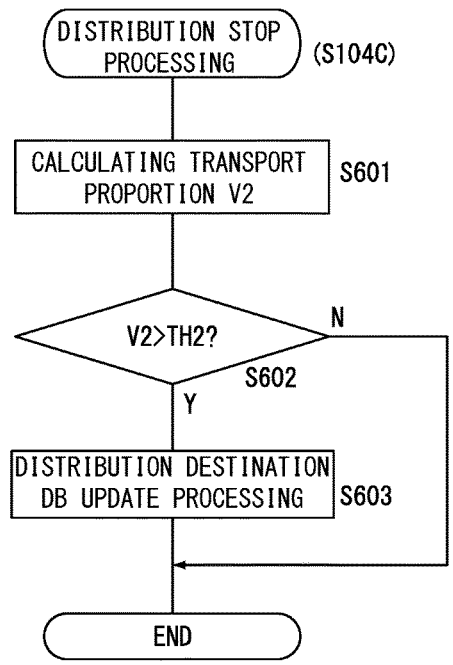

Subsequently, the report receiving server 1 executes the distribution stop processing S104C (distribution stop processing S104 in FIG. 3). In the distribution stop processing S104C, specifically as illustrated in FIG. 9B, the report receiving server 1 first acquires the distribution count and the count of moves of the corresponding user ID from the information corresponding to the e-mail newsletter ID 11b stored in the history DB 9a at Step S601. The report receiving server 1 divides the count of moves by the distribution count to calculate a move proportion V2 to this user.

At this time, the report receiving server 1 calculates only the move proportion V2 of the user ID in the updated DB. However, the report receiving server 1 may calculate the move proportion V2 of each user stored in the history DB 9a and execute the following processing on each user.

Next, the report receiving server 1 compares the move proportion V2 corresponding to the acquired user ID and a move proportion threshold TH2 at Step S602. When the move proportion V2 becomes larger than the move proportion threshold TH2 at Step S602, the report receiving server 1 executes the distribution destination DB update processing at Step S603 to execute processing for distribution stop.

When the move proportion V2 is equal to or less than the move proportion threshold TH2, the report receiving server 1 terminates the distribution stop processing S104C.

In the above-described third embodiment, the distribution stop condition is a condition based on the proportion of the count of e-mail distribution content on which the move operation has been performed by the user to the count of e-mail distribution content distributed to the user in the e-mail distribution content group having the identical series identification information. That is, if the count of e-mail distribution content on which the move operation has been performed by the user in the e-mail distribution content group having the identical e-mail newsletter ID exceeds the certain proportion, the distribution stop is executed.

Therefore, since the move proportion V2 changes in association with the change in the count of moves to the distribution count, in addition to the effects described in the first embodiment, this allows providing the e-mail newsletter distribution system fitting in the change in the user's interest.

4-4. Fourth Embodiment

The fourth embodiment describes an example where the distribution of the corresponding e-mail newsletter is stopped according to the proportion of the count of distribution content on which the move operation has been performed to n pieces of distribution content of the-mail newsletters distributed most recently to the user.

The processing by the report receiving server 1 in the fourth embodiment is as follows. After receiving the report mail, the report receiving server 1 executes the report analysis processing at Step S102 to acquire the user ID 11a, the e-mail newsletter ID 11b, and the issue ID 11c.

Next, the report receiving server 1 executes the history DB update processing at Step S103. Specifically, the report receiving server 1 adds 1 to the count of moves of the user ID 11a for the information on the e-mail newsletter ID 11b stored in the history DB 9a. This embodiment stores the moving flag for each issue ID in addition to the time information for each issue ID, which is shown in FIG. 7B, or instead of the time information for each issue ID.

The report receiving server 1 acquires the move operation date 11f by the report analysis processing at Step S102. Then, the report receiving server 1 changes the move operation date for each issue ID shown in FIG. 7B from "No Data" to the time information by the history DB update processing at Step S103. Thus, the report receiving server 1 may substitute the moving flag.

Figure 10A:
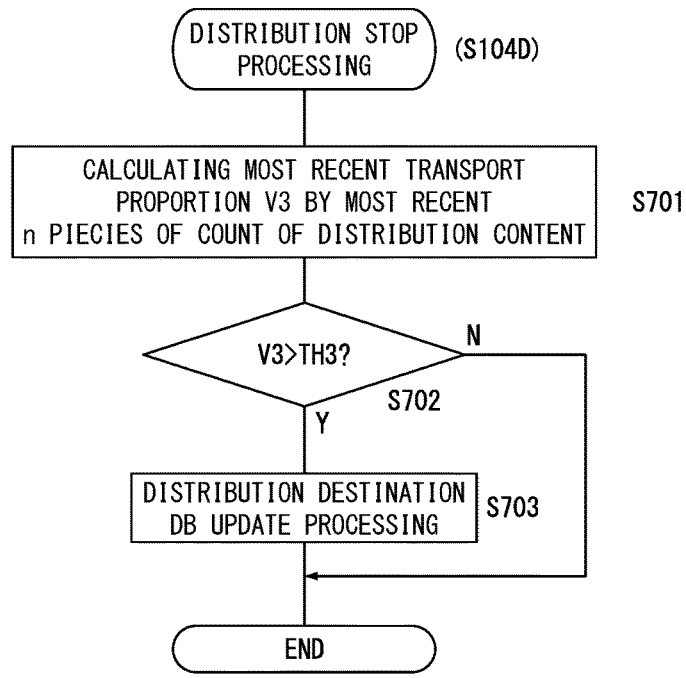
FIG. 10A and FIG. 10B are flowcharts illustrating distribution stop processing in a fourth embodiment and a fifth embodiment.

Subsequently, the report receiving server 1 executes the distribution stop processing S104D (distribution stop processing S104 in FIG. 3). In the distribution stop processing S104D, specifically as illustrated in FIG. 10A, the report receiving server 1 first acquires the count of moves to most recent n pieces of the count of distribution content of the distributed e-mail newsletter from the information of the corresponding user ID corresponding to the e-mail newsletter ID 11b stored in the history DB 9a at Step S701. The report receiving server 1 divides the count of moves by the most recent distribution count n to calculate a most recent move proportion V3. The n pieces of most recent count of moves may be preliminary stored in the history DB 9a or may be calculated from the moving flag or a similar flag for each issue ID in each case.

Next, the report receiving server 1 compares the most recent move proportion V3 corresponding to the acquired user ID and a most recent move proportion threshold TH3 at Step S702. When the most recent move proportion V3 becomes larger than the most recent move proportion threshold TH3 at Step S702, the report receiving server 1 executes the distribution destination DB update processing at Step S703 to execute processing for distribution stop. When the most recent move proportion V3 is equal to or less than the most recent move proportion threshold TH3, the report receiving server 1 terminates the distribution stop processing S104D.

In the above-described fourth embodiment, the distribution stop condition is a condition based on the proportion of the e-mail distribution content on which the move operation has been performed by the user to the predetermined count of most recent e-mail distribution content distributed to the user in the e-mail distribution content group having the identical series identification information. That is, in the n pieces of e-mail distribution content group having the identical e-mail newsletter ID distributed most recently, if the count of e-mail distribution content on which the move operation has been performed by the user exceeds the threshold, the distribution stop is executed.

Therefore, since the most recent move proportion V3 changes in association with the change in the count of moves to the most recent predetermined distribution count, in addition to the effects described in the first embodiment, this allows providing the e-mail newsletter distribution system further reflecting the change in the user's interest.

Here, the most recent distribution count n is described as a constant. However, for example, the count of content of the e-mail newsletter distributed during most recent m months may be set as the most recent distribution count n.

In this case, the distribution stop condition is a condition based on the proportion of the e-mail content on which the move operation has been performed by the user to the e-mail distribution content distributed to the user during a predetermined period in the e-mail distribution content group having the identical series identification information. That is, if the proportion of the e-mail distribution content on which the move operation has been performed by the user in the e-mail distribution content group having the identical e-mail newsletter ID distributed during the most recent m months exceeds a certain count, the distribution stop is executed.

Therefore, in addition to the effects described in the first embodiment, in the case of irregular distribution of the e-mail newsletters, this allows providing the e-mail newsletter distribution system fitting in the latest change in user's interest.

Further, setting no-move operation on the e-mail newsletters distributed during most recent p months as a condition, the move history information initialization processing may be executed. Here, the move history information initialization processing is processing such as returning respective values in the history DB 9a to the initial values. The processing is, for example, processing of zeroing the count of moves shown in FIG. 7B and processing of returning the moving flag for each issue ID to OFF as described above.

In this case, if the user does not perform the move operation on all the e-mail distribution content distributed to the user during the predetermined most recent period, the move history managing unit 7 executes the move history information initialization processing that initializes the move history information. That is, if the user does not perform the move operation on the e-mail distribution content group having the identical e-mail newsletter ID distributed during the most recent p months, the move history managing unit 7 infers that the user's interest has changed (namely, the user has found an interest). The move history managing unit 7 initializes the respective values and flags used for determination of the distribution stop condition.

This allows providing the e-mail newsletter distribution system reflecting the latest change in user's interest, in addition to the respective effects described in the second embodiment and the third embodiment.

4-5. Fifth Embodiment

The fifth embodiment describes an example of stopping the distribution of the corresponding e-mail newsletter according to the opening date when the e-mail newsletter is opened and the move operation date when the user performs the move operation.

The processing by the report receiving server 1 in the fifth embodiment is as follows. After receiving the report mail, the report receiving server 1 executes the report analysis processing at Step S102 to acquire the user ID 11a, the e-mail newsletter ID 11b, the issue ID 11c, the received time 11d, the opening date 11e, and the move operation date 11f.

Next, the report receiving server 1 executes the history DB update processing at Step S103. Specifically, the report receiving server 1 adds 1 to the count of moves of the user ID 11a for the information on the e-mail newsletter ID 11b stored in the history DB 9a. This operation rewrites the received time, the opening date, and the move operation date for each issue ID from "No Data" to the time information.

Figure 10B:
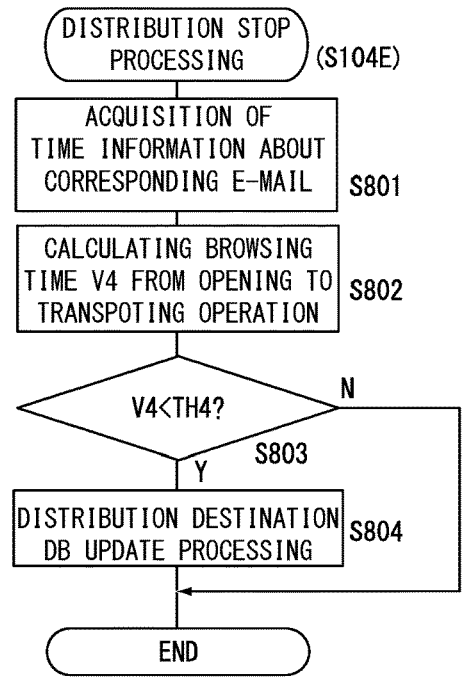

Subsequently, the report receiving server 1 executes the distribution stop processing S104E (distribution stop processing S104 in FIG. 3). In the distribution stop processing S104E, specifically as illustrated in FIG. 10B, the report receiving server 1 first acquires the opening date and the move operation date of the issue ID included in the report mail from the information of the corresponding user ID corresponding to the e-mail newsletter ID 11b stored in the history DB 9a at Step S801. The report receiving server 1 calculates a difference between the opening date and the move operation date as a browsing period V4 at Step S802.

Next, the report receiving server 1 compares the browsing period V4 corresponding to the acquired user ID and a browsing period threshold TH4 at Step S803. If the browsing period V4 is smaller than the browsing period threshold TH4 at Step S802, the report receiving server 1 executes the distribution destination DB update processing at Step S804 to execute the processing for distribution stop. If the browsing period V4 is equal to or more than the browsing period threshold TH4, the report receiving server 1 terminates the distribution stop processing S104E.

In the above-described fifth embodiment, the following is configured. The report information includes an opening date and a move operation date. The opening date is as time information when the user opens the e-mail distribution content. The move operation date is as time information when the move operation has been performed. The move history managing unit 7 is configured to manage the move history information including the opening date and the move operation date. The distribution stop condition is a condition based on information on differential time between the opening date and the move operation date. That is, when the period from when the user opens the e-mail as the e-mail newsletter until the user performs the move operation is smaller than the certain value, the distribution stop is executed. For example, this applies to the case where the user hardly browses the e-mail newsletter and moves the e-mail newsletter to the junk mail folder.

Therefore, in addition to the effects described in the first embodiment, this allows providing the e-mail newsletter distribution system reflecting the substantial user's interest.

Here, to calculate the browsing period V4, the report receiving server 1 uses the time information for the issue ID included in the report mail. However, the browsing period V4 is calculated for each issue, an average browsing period aveV4 is calculated as the average value, and the average browsing period aveV4 is compared with an average browsing period threshold aveTH4 at Step S803. Thus, the distribution stop may be performed.

In this case, the distribution stop condition is a condition based on an average value calculated by averaging information of the respective differential times among the e-mail distribution content on which the move operation has been performed by the user in the e-mail distribution content group having the identical series identification information. That is, when the average browsing period aveV4 by the user to the e-mail distribution content group having the identical e-mail newsletter ID becomes smaller than the certain value, the distribution stop is executed. For example, this applies to the case where the user hardly browses the e-mail newsletters with the identical title every time and moves the e-mail newsletters to the junk mail folder.

In addition to the effects described in the first embodiment and the effects described in this above-described embodiment, this allows providing the e-mail newsletter distribution system fitting in the change in the user's substantial interest.

Further, as long as the average browsing period aveV4 is equal to or more than the certain value, the distribution stop is not performed. This allows preventing the distribution stop caused by the mistaken move operation by the user while hardly browsing the e-mail.

Further, in this embodiment, the report receiving server 1 calculates the browsing period V4 from the opening date and the move operation date. However, the report receiving server 1 calculates the time information instead of the browsing period V4 from the received time and the move operation date. Thus, the report receiving server 1 may perform determination on the distribution stop using the time information at Step S803. In this case, it is also possible to infer the user's interest on the content of the e-mail newsletter unread and thrown away to some extent.

5. Modifications of User Notification

Here, the following describes a modification of executing user notification processing that notifies the user of the distribution stop of e-mail newsletter in the above-described respective embodiments.

Here, the respective modifications will be described based on the above-described configuration of the second embodiment. However, the respective modifications are applicable to the respective embodiments, which are described in the first embodiment to the fifth embodiment.

5-1. Modification 1

Figure 11A:
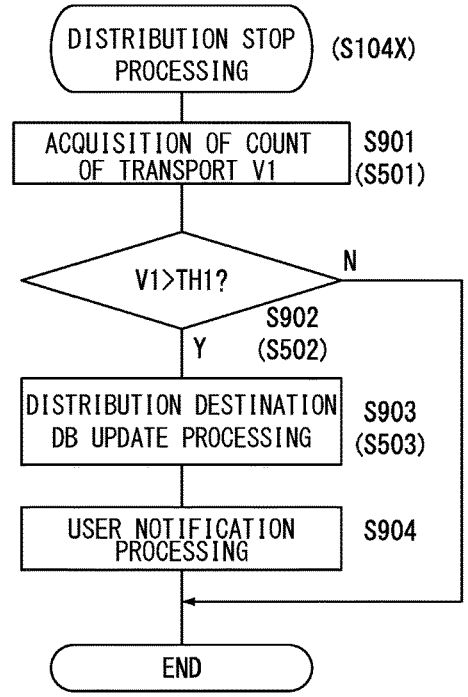
FIG. 11A and FIG. 11B are flowcharts illustrating distribution stop processing in a modification of user notification.

Modification 1 executes Step S104X as the distribution stop processing S104 in FIG. 3. As illustrated in FIG. 11A, in the distribution stop processing S104X, first, the report receiving server 1 executes the processing similar to Step S501 to Step S503 in the second embodiment at Step S901 to Step S903.

After execution of Step S903, next, the report receiving server 1 executes the user notification processing at Step S904. The user notification processing notifies the distribution stop of the e-mail newsletter corresponding to the e-mail newsletter ID acquired from the report mail. For example, the user notification processing transmits an e-mail that includes a text notifying the distribution stop of the corresponding e-mail newsletter in the body text or the title of the e-mail to the corresponding user.

According to the above-described Modification 1, in the case where the distribution stopping unit 8 determines the distribution stop of the e-mail distribution content to the user, to execute the distribution stop processing and then execute the notification processing to the user, the report receiving server 1 executes the notification processing to the user after the distribution stop of the e-mail newsletter.

This prevents the user from unrecognizing the distribution stop, ensuring obtaining reliability from the user. At the distribution stop of the e-mail newsletter, the user is not required to perform a new operation, avoiding an increase in operational burden on the user.

5-2. Modification 2

Figure 11B:
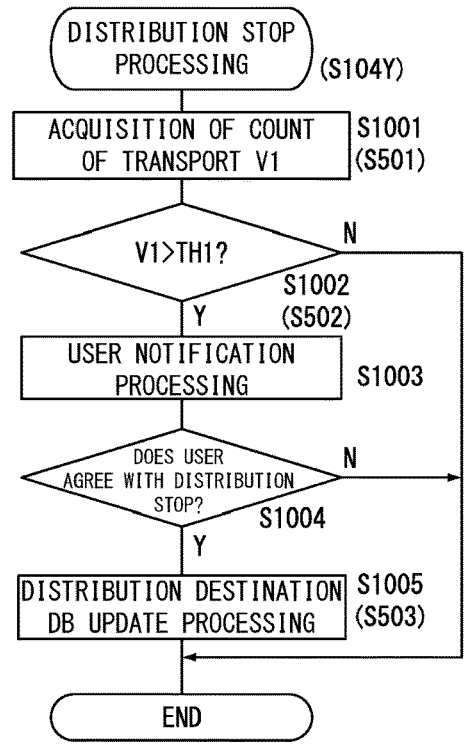

Modification 2 executes Step S104Y as the distribution stop processing S104 in FIG. 3. As illustrated in FIG. 11B, in the distribution stop processing S104Y, first, the report receiving server 1 executes the processing similar to Steps S501 and S502 in the second embodiment at Step S1001 and Step S1002. If the report receiving server 1 determines that the distribution stop condition is not met at Step S1002, the report receiving server 1 terminates the distribution stop processing S104Y. If determining that the distribution stop condition is met, the report receiving server 1 executes the user notification processing at Step S1003.

In the user notification processing, for example, the report receiving server 1 creates an e-mail for confirmation of whether to stop distributing the corresponding e-mail newsletter or not and transmits the e-mail to the corresponding user. To this e-mail, the report receiving server 1 executes the determination on whether the user agrees to the distribution stop within a predetermined period or not at Step S1004. When the report receiving server 1 determines that the user agrees to the distribution stop within the predetermined period at Step S1004, the report receiving server 1 executes the distribution destination DB update processing to execute the processing for distribution stop at Step S1005. If the report receiving server 1 determines that the user does not agree to the distribution stop within the predetermined period at Step S1004, the report receiving server 1 terminates the distribution stop processing S104Y.

In the above-described Modification 2, when the distribution stopping unit 8 determines the distribution stop of the e-mail distribution content to the user, the distribution stopping unit 8 executes the notification processing to the user and then executes the distribution stop processing based on the response to this notification processing from the user. That is, the distribution stop is executed upon the user's agreement. Therefore, the user's mistaken move operation does not immediately stop distributing the e-mail newsletter. This allows providing the e-mail newsletter distribution system fitting in the user's actual inclination.

Here, regarding the user's agreement to the distribution stop of the e-mail newsletter, for example, a reply to the e-mail may be regarded that the user agrees to the distribution stop. Alternatively, clicking a Uniform Resource Locator (URL) described in the e-mail may be regarded that the user agrees to the distribution stop.

Further, by inputting some sort of information, a questionnaire, or similar information in an input form in a predetermined URL by the user, the agreement to distribution stop may be acquired.

In this case, the distribution stopping unit 8 executes the distribution stop processing under a condition that the user responds expressing the desire of distribution stop within the predetermined period. Only when the user responds on the distribution stop, the distribution stop of the e-mail newsletter is executed. This prevents mistakenly stopping the distribution of the e-mail newsletter. This allows providing the e-mail newsletter distribution system fitting in an inclination of a distributor of the e-mail newsletter who wants to continue the distribution as much as possible.

Additionally, if there is no response from the user within the predetermined period, the user may be regarded to agree to the distribution stop.

In this case, the distribution stopping unit 8 executes the distribution stop processing under a condition that the user does not respond for the predetermined period. Accordingly, even if the user does not respond, the distribution of the e-mail newsletter is stopped. This allows providing the e-mail newsletter distribution system that executes the distribution stop without increasing the operational burden on the user.

Further, when the user responds within the predetermined period, the report receiving server 1 may determine that the user intends to desire the distribution continuation (that is, the user does not agree to the distribution stop) and may continue the distribution of the e-mail newsletter. For example, this can be achieved by describing the text like "To continue the distribution, reply this mail." in the body text of the e-mail.

In view of this, the distribution stopping unit 8 does not execute the distribution stop processing under the condition that the user responds expressing the desire of the distribution continuation within the predetermined period. This allows providing the e-mail newsletter distribution system that executes the distribution stop without increasing the operational burden on the user regarding the distribution stop and preventing erroneous distribution stop.

Furthermore, when the user responds expressing the desire of the distribution continuation within the predetermined period, the report receiving server 1 can also execute distribution continuation processing. Here, the distribution continuation processing is processing such as returning the respective values in the history DB 9a determined to meet the distribution stop condition to the initial values. The processing is, for example, processing of zeroing the count of moves shown in FIG. 7B and processing of returning the moving flag for each issue ID to OFF, which is described in the fourth embodiment.

The distribution stopping unit 8 executes the distribution continuation processing, which continues the distribution, under a condition that the user responds expressing the desire of the distribution continuation within the predetermined period. Accordingly, the distribution stopping unit 8 determines that the distribution stop condition is met whenever the distribution of the e-mail newsletter is executed. This allows preventing troublesomeness that user notification mail is transmitted each time.

6. Other Modifications

The present invention is not limited to the above-described embodiments and modifications. The following various other modifications are possible.

The above-described respective embodiments and respective modifications describe the example of moving the e-mail to the junk mail folder as an exemplary move operation. However, instead of the junk mail folder, a recycle bin folder may be used. Alternatively, instead of the junk mail folder, a specific folder or a dedicated folder, such as a distribution stop folder, may be used. When the move operation is an operation of moving the e-mail to the distribution stop folder, the user does not transmit clear intention of desiring distribution stop externally. However, it is clear that the user wants to stop the distribution; therefore, promptly stopping the distribution is preferable.

The above-described report mail needs not to be always transmitted according to the move operation by the user. For example, when a predetermined contract is made between a service provider of webmail and the distributor of the e-mail newsletter, the transmission service of report mail may be performed.

The example of the history DB 9a of the e-mail newsletter DB 9 includes the received time, the opening date, and the move operation date as the time information for each issue ID is described. However, the history DB 9a may not store the time information for each of all issued issue ID. For example, in the case where the distribution stop condition is determined using the most recent distribution count n shown in the fourth embodiment, it is only necessary that the history DB 9a store the time information on the n pieces of most recent distributions.

Further, regarding the distribution stop of e-mail newsletter, the distribution stop may be performed by divided into a plurality of phases. For example, in the case where the distribution stop condition is met at the first time, the report receiving server 1 may stop distribution of only an e-mail newsletter issued as an extra. In the case where the distribution stop condition is met at the second time, the report receiving server 1 may stop distribution of the e-mail newsletters of all issues.

7. Program and Storage Medium

The report receiving server 1 as the embodiments of the information processing device of the present invention is described above. The program of the embodiments is a program that causes the information processing device (such as a CPU) to execute respective processing in the report receiving server 1.

The program of the embodiment causes the information processing device to execute the processing that acquires the report information transmitted according to the move operation, which moves the e-mail distribution content in series and whose plurality of issues are distributed or are expected to be distributed to the specific folder by the user who has browsed the e-mail distribution content. The program also causes the information processing device to execute processing that acquires the user ID of the user who has performed the move operation and the e-mail newsletter ID of the e-mail distribution content, which are at least included in the report information, and manages the user ID and the e-mail newsletter ID as the move history information of the user for the series of the e-mail distribution content. Further, the program causes the information processing device to execute processing that determines whether to stop distributing the e-mail distribution content to the user or not based on the move history information and the predetermined distribution stop condition and execute the distribution stop processing of the e-mail distribution content to the user based on this determination result.

That is, this program is a program that causes the report receiving server 1 to execute a part of processing described in FIG. 3 and each processing described in FIG. 8A to FIG. 11B.

This program allows achieving the information processing device as the above-described report receiving server 1.

Such program can be preliminary recorded in an HDD as a recording medium built into a device such as a computer device, a ROM in a microcomputer including a CPU, or a similar medium. Alternatively, a removable recording medium, such as a semiconductor memory, a memory card, an optical disk, a magneto-optical disk, or a magnetic disk can store (record) the program temporarily or permanently. Such removable recording medium can be provided as so-called package software. Such program can be installed from the removable recording medium to a personal computer or a similar device.

Besides, the program can also be downloaded from a download site via a network such as a LAN and the Internet.

REFERENCE SIGNS LIST

1 report receiving server
2 communications network
3 outgoing mail server
5 user terminal
6 report information acquiring unit
7 move history managing unit
8 distribution stopping unit
9 e-mail newsletter DB
9a history DB
9b distribution destination DB
11 move history information

What is claimed is:

1. A computer architecture comprising:
at least one memory operable to store computer program code; and
at least one processor operable to read said computer program code and operate as instructed by said computer program code, said computer program code comprising:
report information acquiring code configured to cause at least one of said at least one processor to acquire report information transmitted from a receiver device according to a move operation by a user, the move operation moving at least one e-mail of a series of e-mails to a specific folder in the receiver device, the series of e-mails being distributed regularly or irregularly from a transmitter device to the user;
move history managing code configured to cause at least one of said at least one processor to acquire user identification information of the user and series identification information identically assigned to each of the series of e-mails, both information being included in the report information, and manage the user identification information and the series identification information as move history information of the user for the series of e-mails; and
distribution stopping code configured to cause at least one of said at least one processor to determine whether to stop distributing the series of e-mails to the user based on the move history information and a predetermined distribution stop condition, and to execute a process for stopping distribution of the series of e-mails from the transmitter device to the user based on a determination to stop distributing the series of e-mails to the user,
wherein executing the process for stopping distribution of the series of e-mails comprises accessing a database that is accessible by the transmitter device and stores information corresponding to a plurality of users, the user being one of the plurality of users, and updating the database to stop transmission of the series of e-mails from the transmitter device to the user,
wherein the series of e-mails comprises first e-mails that are distributed irregularly from the transmitter device to the user and second e-mails that are distributed regularly from the transmitter device to the user,
wherein the process for stopping distribution of the series of e-mails comprises a first process and a second process,
wherein the first process is performed based on the determination to stop distributing the series of e-mails being made a first time, and comprises accessing the database and updating the database to stop transmission of the first e-mails, and
wherein the second process is performed based on the determination to stop distributing the series of e-mails to the user being made a second time, and comprises accessing the database and updating the database to stop transmission of the second e-mails.

2. The computer architecture according to claim 1, wherein the predetermined distribution stop condition is based on at least one of:
the at least one e-mail from among the series of e-mails;
a proportion of a count of the at least one e-mail to a count of the series of e-mails; and a proportion of a count of the at least one e-mail to a count of e-mails distributed to the user within a predetermined period.

3. The computer architecture according to claim 2, wherein
the move history managing code is further configured to cause at least one of said at least one processor to execute a move history information initialization process configured to initialize move history information in a case where the move operation has not been performed by the user on all of the e-mails distributed to the user within a predetermined most recent period.

4. The computer architecture according to claim 1, wherein
the report information includes an opening date and a move operation date, the opening date being as time information when the user opens the e-mails, the move operation date being time information when the move operation has been performed,
the move history managing code configured to cause at least one of said at least one processor to manage the move history information including the opening date and the move operation date, and
the predetermined distribution stop condition is a condition based on information on differential time between the opening date and the move operation date.

5. The computer architecture according to claim 4, wherein
the predetermined distribution stop condition is a condition based on an average value calculated by averaging information of the respective differential times among the e-mails on which the move operation has been performed by the user, among the series of e-mails.

6. The computer architecture according to claim 1, wherein
the distribution stopping code configured to cause at least one of said at least one processor to execute the distribution stop process and then execute a notification process to the user in a case where the distribution stopping code determines distribution stop of the e-mails to the user.

7. The computer architecture according to claim 6, wherein
the distribution stopping code is further configured to cause at least one of said at least one processor to execute the notification process to the user and then execute the distribution stop process based on a response to the notification process from the user in a case where the distribution stopping code determines distribution stop of the e-mails to the user.

8. The computer architecture according to claim 7, wherein
the distribution stopping code is further configured to cause at least one of said at least one processor to execute the distribution stop process under a condition that the user does not respond for a predetermined period.

9. The computer architecture according to claim 7, wherein
the distribution stopping code is further configured to cause at least one of said at least one processor to execute the distribution stop process under a condition that the user responds within a predetermined period indicating that the user wishes to stop distribution.

10. The computer architecture according to claim 7, wherein the distribution stopping code is further configured to cause at least one of said at least one processor to not execute the distribution stop process under a condition that the user responds within a predetermined period indicating that the user wishes to continue distribution.

11. The computer architecture according to claim 10, wherein
the distribution stopping code is further configured to cause at least one of said at least one processor to execute a distribution continuation process to continue distribution under a condition that the user responds within the predetermined period indicating that the user wishes to continue distribution.

12. The computer architecture according to claim 1, wherein the database comprises a plurality of distribution flags respectively corresponding to the plurality of users,
wherein the transmitter device controls transmission of the series of e-mails to the user based on a distribution flag of the plurality of distribution flags corresponding to the user, and
wherein the process for stopping distribution of the series of e-mails comprises accessing the database to update the distribution flag to stop the transmitter device from transmitting the series of e-mails from the transmitter device to the user.

13. The computer architecture according to claim 1, wherein the database is updatable by the transmitter device.

14. The computer architecture according to claim 13, wherein the database comprises a distribution database and a performance database,
wherein the distribution database comprises a plurality of distribution flags respectively corresponding to the plurality of users, and
wherein the performance database comprises the plurality of distribution counts respectively corresponding to the plurality of users.

15. The computer architecture according to claim 14, wherein the plurality of distribution counts is updated by the transmitter device.

16. The computer architecture according to claim 1,
wherein the second process is performed based on the determination to stop distributing the series of e-mails to the user being made the second time after the database has been updated to stop transmission of the first e-mails.

17. An information processing method, comprising:
acquiring report information transmitted from a receiver device according to a move operation by a user, the move operation moving at least one e-mail of a series of e-mails to a specific folder in the receiver device, the series of e-mails being distributed regularly or irregularly from a transmitter device to the user;
acquiring user identification information of the user and series identification information identically assigned to each of the series of e-mails, both information being included in the report information;
managing the user identification information and the series identification information as move history information of the user for the series of e-mails; and
determining whether to stop distributing the series of e-mails from the transmitter device to the user based on the move history information and a predetermined distribution stop condition; and
executing a process for stopping distribution of the series of e-mails to the user based on a determination to stop distribution of the series of e-mails, wherein execution of the process for stopping distribution of the series of e-mails comprises accessing a database that is accessible by the transmitter device and stores information corresponding to a plurality of users, the user being one of the plurality of users, and updating the database to stop transmission of the series of e-mails from the transmitter device to the user, wherein the series of e-mails comprises first e-mails that are distributed irregularly from the transmitter device to the user and second e-mails that are distributed regularly from the transmitter device to the user, wherein the process for stopping distribution of the series of e-mails comprises a first process and a second process, wherein the first process is performed based on the determination to stop distributing the series of e-mails being made a first time, and comprises accessing the database and updating the database to stop transmission of the first e-mails, and wherein the second process is performed based on the determination to stop distributing the series of e-mails to the user being made a second time, and comprises accessing the database and updating the database to stop transmission of the second e-mail.

18. A non-transitory computer readable storage medium that stores a program, the program causing a computer processing system to execute a process of:

acquiring report information transmitted from a receiver device according to a move operation by a user, the move operation moving at least one e-mail of a series of e-mails to a specific folder in the receiver device, the series of e-mails being distributed regularly or irregularly from a transmitter device to the user;

acquiring user identification information of the user and series identification information identically assigned to each e-mail of the series of e-mails, both information being included in the report information;

managing the user identification information and the series identification information as move history information of the user for the series of e-mails;

determining whether to stop distributing the series of e-mails from the transmitter device to the user based on the move history information and a predetermined distribution stop condition; and executing a process for stopping distribution of the series of e-mails to the user based on a determination to stop distributing the series of e-mails, wherein executing the process for stopping distribution of the series of e-mails comprises accessing a database that is accessible by the transmitter device and stores information corresponding to a plurality of users, the user being one of the plurality of users, and updating the database to stop transmission of the series of e-mails from the transmitter device to the user, wherein the series of e-mails comprises first e-mails that are distributed irregularly from the transmitter device to the user and second e-mails that are distributed regularly from the transmitter device to the user, wherein the process for stopping distribution of the series of e-mails comprises a first process and a second process, wherein the first process is performed based on the determination to stop distributing the series of e-mails being made a first time, and comprises accessing the database and updating the database to stop transmission of the first e-mails, and wherein the second process is performed based on the determination to stop distributing the series of e-mails to the user being made a second time, and comprises accessing the database and updating the database to stop transmission of the second e-mail.

* * * * *